(12) United States Patent
    Chida et al.

(10) Patent No.: US 11,242,845 B2
(45) Date of Patent: Feb. 8, 2022

(54) LINEAR COMPRESSOR AND DEVICE MOUNTED WITH THE SAME

(71) Applicant: Hitachi Automotive Systems, Ltd., Hitachinaka (JP)

(72) Inventors: Tadahiko Chida, Tokyo (JP); Yoshinori Kawai, Hitachinaka (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 284 days.

(21) Appl. No.: 16/339,543

(22) PCT Filed: Sep. 29, 2017

(86) PCT No.: PCT/JP2017/035622
§ 371 (c)(1),
(2) Date: Apr. 4, 2019

(87) PCT Pub. No.: WO2018/070281
PCT Pub. Date: Apr. 19, 2018

(65) Prior Publication Data
US 2021/0180578 A1    Jun. 17, 2021

(30) Foreign Application Priority Data
Oct. 14, 2016    (JP) .............................. JP2016-202244

(51) Int. Cl.
 *F04B 35/04*    (2006.01)
 *F04B 39/12*    (2006.01)
 (Continued)

(52) U.S. Cl.
 CPC ............ *F04B 35/045* (2013.01); *F04B 35/04* (2013.01); *F04B 39/121* (2013.01); *F04B 53/14* (2013.01); *H02K 33/16* (2013.01)

(58) Field of Classification Search
 CPC ............ F04B 35/045; F04B 2203/0402; F04B 17/04; F04B 2203/0401; F04B 2207/045;
 (Continued)

(56) References Cited

U.S. PATENT DOCUMENTS 6,129,527 A    10/2000   Donahoe
6,848,892 B1*    2/2005   Morita .................. F04B 49/065
                                                                417/417
 (Continued)

FOREIGN PATENT DOCUMENTS

JP    H5-073275 U    10/1993
JP    H11-146631 A    5/1999
 (Continued)

OTHER PUBLICATIONS

International Search Report with English translation and Written Opinion issued in corresponding application No. PCT/JP2017/035622 dated Dec. 12, 2017.

Primary Examiner — Dominick L Plakkoottam
(74) Attorney, Agent, or Firm — Foley & Lardner LLP

(57) ABSTRACT

Provided is a compressor in which vibration resistance against an excitation force due to drive of a linear motor is improved. A linear compressor 1 includes: a mover 101 and a stator 102 which relatively move in a first direction and a second direction that is an opposite direction to the first direction; and an inverter portion 300 which includes a printed circuit board 305 and circuit elements 302 and 304 connected to the printed circuit board 305 through connection lead lines 306 extending from the printed circuit board 305, wherein the printed circuit board 305 is installed in a direction substantially perpendicular to the first direction.

20 Claims, 8 Drawing Sheets

(51) Int. Cl.
*F04B 53/14* (2006.01)
*H02K 33/16* (2006.01)

(58) Field of Classification Search
CPC .. F04B 35/04; F04B 49/06; F04B 2201/0201;
F04B 2201/0206; F04B 2201/0806; F04B
39/00; F04B 39/064; F04B 39/121; F04B
49/065; F04C 2240/808; F04C 2240/30;
F04C 2240/403; F04C 2240/803; F04C
23/02; F04C 29/0085; F04C 29/047
See application file for complete search history.

(56) References Cited

U.S. PATENT DOCUMENTS

| | | | | |
|---|---|---|---|---|
| 8,192,178 B2* | 6/2012 | Nishii | | F04C 23/008 |
| | | | | 417/410.5 |
| 8,221,088 B2* | 7/2012 | Tian | | F04B 49/06 |
| | | | | 417/12 |
| 8,550,789 B2* | 10/2013 | Hu | | F04B 49/065 |
| | | | | 417/44.11 |
| 8,794,934 B2* | 8/2014 | Kang | | H02P 25/062 |
| | | | | 417/417 |
| 8,926,296 B2* | 1/2015 | Dainez | | F04B 49/06 |
| | | | | 417/417 |
| 9,243,620 B2* | 1/2016 | Choi | | F04B 35/045 |
| 9,915,260 B2* | 3/2018 | Dainez | | H02P 25/032 |
| 2005/0223727 A1 | 10/2005 | Funahashi | | |
| 2010/0141066 A1* | 6/2010 | Jang | | H01R 11/09 |
| | | | | 310/71 |
| 2011/0126568 A1* | 6/2011 | Okuda | | H05K 7/2029 |
| | | | | 62/259.2 |
| 2011/0135518 A1* | 6/2011 | Kang | | H02K 33/16 |
| | | | | 417/417 |
| 2014/0105764 A1* | 4/2014 | Lee | | F04B 39/121 |
| | | | | 417/363 |
| 2015/0056086 A1* | 2/2015 | Yano | | H02K 11/33 |
| | | | | 417/410.5 |
| 2018/0191220 A1* | 7/2018 | Kato | | F04C 29/04 |

FOREIGN PATENT DOCUMENTS

| | | |
|---|---|---|
| JP | 2000-329064 A | 11/2000 |
| JP | 2004-162618 A | 6/2004 |
| JP | 2006-037868 A | 2/2006 |

* cited by examiner

LINEAR COMPRESSOR AND DEVICE MOUNTED WITH THE SAME

TECHNICAL FIELD

The present invention relates to a linear compressor and a device mounted with the same.

BACKGROUND ART

A technology of driving a linear motor or a compressor mounted with the linear motor by an inverter has been known. An inverter circuit may be disposed on a board and be installed in the vicinity of the linear motor or the compressor.

PTL 1 discloses a printed circuit board 23 provided in a direction substantially parallel to a reciprocating direction of a mover $3m$ in a linear motor 3 including the mover $3m$ with windings and a stator $3s$ having a permanent magnet $3p$. An electronic component $10e$ is mounted on the printed circuit board 23.

CITATION LIST

Patent Literature

PTL1: JP H11-146631 A

SUMMARY OF INVENTION

Technical Problem

In PTL 1, the printed circuit board 23 is installed to be substantially parallel to the reciprocating direction of the mover $3m$. An electronic component such as a capacitor or a coil provided on the printed circuit board 23 is usually attached to the printed circuit board 23 through a connection lead line extending from the printed circuit board 23 in a direction substantially perpendicular to the printed circuit board 23. Since the capacitor or the coil has a certain mass, it has a structure like a pendulum fixed to the printed circuit board 23 through the connection lead line.

Here, when the reciprocating direction of the mover $3m$ is substantially parallel to the printed circuit board 23 as in PTL 1, for example, an excitation force in a direction in which the pendulum is swung acts on the electronic component by reciprocation of the linear motor 3. For this reason, stress is applied in a direction in which the connection lead line is broken, such that there is room for improvement in vibration resistance.

An object of the invention is to provide a linear compressor having a high reliability by improving vibration resistance, and a device mounted with the same.

It should be noted that the reference numerals in the description described above are the reference numerals used in PTL 1 and are unrelated to reference numerals used in the present specification.

Solution to Problem

In view of the above circumstances, the invention provides a linear compressor including: a mover and a stator which relatively move in a first direction and a second direction that is an opposite direction to the first direction; and an inverter portion which includes a printed circuit board and circuit elements connected to the printed circuit board through connection lead lines extending from the printed circuit board, wherein the printed circuit board is installed in a direction substantially perpendicular to the first direction.

Advantageous Effects of Invention

According to the invention, it is possible to provide a linear compressor having a high reliability by improving vibration resistance of circuit elements mounted on a printed circuit board, and a device mounted with the same.

Objects, configurations, and effects other than those described above will be clarified from a description of embodiments provided below.

DESCRIPTION OF EMBODIMENTS

Figure 1:
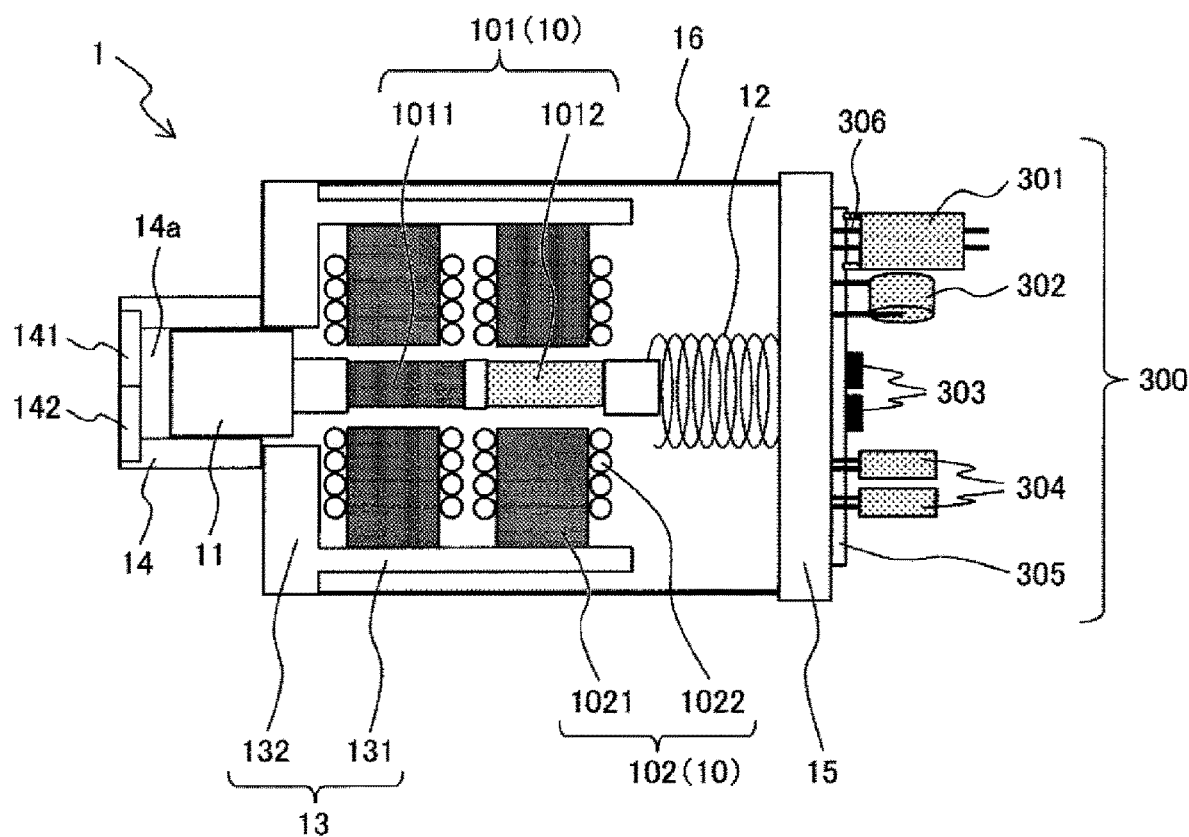
FIG. 1 is a schematic cross-sectional view of a linear compressor according to a first embodiment.

Hereinafter, embodiments of the invention will be described in detail with reference to the drawings. The same components will be denoted by the same reference numerals, and the same description will not be repeated. For convenience of a description, the terms such as a top and bottom direction, a front and rear direction, and a left and right direction that are orthogonal to each other are used, but unless otherwise specified, a gravity direction is not necessarily a downward direction, and may be a top direction, a bottom direction, a left direction, a right direction, a front direction, or a rear direction, or another direction.

Therefore, the top and bottom direction is not related to a top and bottom direction (vertical direction) in amounted state of a device.

In addition, in the present embodiment, an orthogonal coordinate system is set so that the front and rear direction, the left and right direction, and the top and bottom direction correspond to a Z-axis direction, an X-axis direction, and a Y-axis direction, respectively. The Z-axis direction is a direction along a moving direction of a mover, that is, a relative displacement direction (reciprocating direction) between an armature and a field magneton as described below.

In addition, in the following description, a direction substantially perpendicular to a printed circuit board 305 refers to a direction substantially perpendicular to a board surface (component mounting surface) of the printed circuit board 305.

First Embodiment

[Linear Compressor 1]

Figure 2:
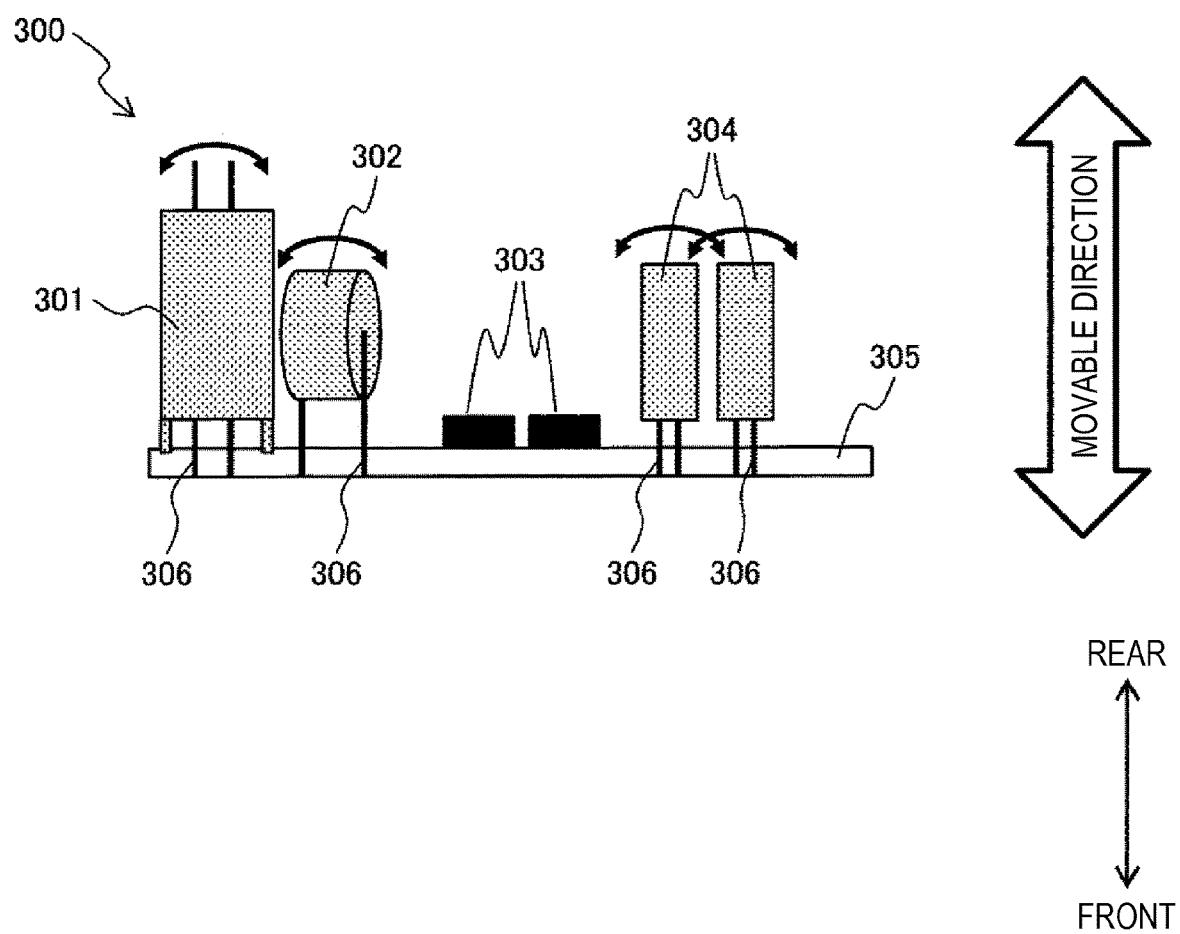
FIG. 2 is a schematic view of an inverter portion according to the first embodiment.

FIG. 1 is a schematic cross-sectional view of a linear compressor 1, and FIG. 2 is a schematic diagram of an inverter portion 300.

The linear compressor 1 includes a linear motor 10, a piston 11, a spring member 12, a motor-side heat radiation member 13, a cylinder 14, a board-side heat radiation member 15, a tubular case 16, and an inverter portion 300.

(Linear Motor 10)

The linear motor 10 includes a mover 101 and a stator 102. The mover 101 and the stator 102 are relatively movable in a first direction and a second direction. The first direction and the second direction are opposite to each other, and in the present embodiment, the first direction and the second direction are a front direction and a rear direction, respectively.

The mover 101 is a flat plate-shaped member having one end connected to the piston 11 and the other end connected to one end of the spring member 12. In the present embodiment, the piston 11 is connected to a front side of the mover 101 and the spring member 12 is connected to a rear side of the mover 101. In addition, the mover 101 includes permanent magnets 1011 and 1012 arranged in the front and rear direction between the piston 11 and the spring member 12. The permanent magnets 1011 and 1012 are magnetized in the top and bottom direction, respectively, to have different polarities. For example, an upper end surface side of the permanent magnet 1011 may be N pole, and an upper end surface side of the permanent magnet 1012 may be S pole. The mover 101 can reciprocate in the front and rear direction, and thus, the piston 11 and the spring member 12 also reciprocate in the front and rear direction.

The stator 102 includes cores 1021 and coils 1022. The coils 1022 are wound around each of the cores 1021, and the cores 1021 and the coils 1022 are provided above and below the mover 101, respectively.

That is, the cores 1021 and the coils 1022 are provided to face flat surfaces of the mover 101, and face magnetic pole surfaces of the permanent magnets 1011 and 1012. A current output from an inverter portion 300 to be described below can flow through the coils 1022, and magnetic fluxes are generated by this current. The coils 1022 are substantially perpendicular to the top and bottom direction, and can supply magnetic fluxes to the permanent magnets 1011 and 1012.

One surface of the core 1021 faces the permanent magnets 1011 and 1012, and the other surface of the core 1021 is attached to the motor-side heat radiation member 13. The core 1021 can be formed of a magnetic material such as iron or an electromagnetic steel plate.

(Piston 11 and Cylinder 14)

The piston 11 can slide on an inner surface of the cylinder 14 having a cylindrical shape. A rear surface side of the piston 11 is connected to the mover 101, and a front surface side of the piston 11 faces a suction portion 141 and a discharge portion 142 of the cylinder 14. A compression chamber 14a capable of compressing or expanding a gas is formed by a space surrounded by the front surface side of the piston 11 and the cylinder 14.

From the suction portion 141, a gas such as a refrigerant or air is introduced from a suction pipe (not illustrated) into the compression chamber. The piston 11 moves in the front direction, such that the gas is compressed to be discharged from the compression chamber through the discharge portion 142.

(Spring Member 12)

The spring member 12 has one end (front end) attached to the other end (rear end) of the mover 101 and the other end (rear end) attached to one surface (front surface) of the board-side heat radiation member 15. The spring member 12 is elastically deformed depending on the reciprocation of the mover 101 to accumulate or release elastic energy. A known spring such as a helical spring or a leaf spring can be adopted as the spring member 12, and the spring member 12 may be another elastic body instead of the spring.

(Motor-Side Heat Radiation Member 13)

The motor-side heat radiation member 13 is a member with which the other surface of the core 1021 is in contact, and can be formed of, for example, a metal. It is preferable that the motor-side heat radiation member 13 uses a material having a high thermal conductivity, for example, a metal such as aluminum, iron, or copper in order to improve heat radiation efficiency of the core 1021 or the coil 1022. However, in a case where an emphasis is put on weight reduction, a high thermal conductive resin can also be used. A specific example of such a resin includes a polyphenylene sulfide (PPS) resin containing a high thermal conductive filler, or the like.

The motor-side heat radiation member 13 includes a plate-shaped portion 131 with which the other surface of the core 1021 is in contact and a positioning portion 132 which is integral with or separate from the plate-shaped portion 131 and is in contact with the plate-shaped portion 131 and the cylinder 14.

It is preferable that the plate-shaped portion 131 uses a material having a high thermal conductivity in order to improve the heat radiation efficiency, as described above. The positioning portion 132 is provided on one side (front side) of the tubular case 16, and the other surface of the positioning portion 132 faces an inner space of the tubular case 16 and one surface of the positioning portion 132 faces the cylinder 14 and an outer side of the tubular case 16. For this reason, in a case where the positioning portion 132 is integrally formed with the plate-shaped portion 131, it is possible to effectively radiate heat by transferring the heat from the plate-shaped portion 131 to the positioning portion 132. In addition, since the positioning portion 132 is positioned in the vicinity of the cylinder 14, when the positioning portion 132 is formed of a non-magnetic material, the positioning portion 132 can suppress leakage of a magnetic flux in a case where the cylinder 14 is formed of a magnetic material.

(Board-Side Heat Radiation Member 15)

The board-side heat radiation member 15 is a metal member attached to the other side (rear side) of the tubular case 16. The other end of the spring member 12 is attached to one surface (front surface) of the board-side heat radiation member 15, and one surface of the printed circuit board 305 of the inverter portion 300 is attached to the other surface (rear surface) of the board-side heat radiation member 15. When the board-side heat radiation member 15 is formed of a material having a high heat conductivity such as a metal, heat radiation efficiency of the inverter portion 300 can be improved, which is preferable.

(Tubular Case 16)

The tubular case 16 is a tubular member whose front and rear surfaces are opened. The board-side heat radiation member 15 and the cylinder 14 are mechanically connected to each other through a motor case portion 13 and the tubular case 16. That is, the cylinder 14 constituting a compressor body, the linear motor 10 housed in the tubular case 16, and the printed circuit board 305 constituting the inverter portion 300 are sequentially arranged in a moving direction (front and rear direction) of the mover 101.

In order to enhance a mechanical strength, the tubular case 16 is formed of a metal such as aluminum. However, for example, in a case where an amount of heat generated in a motor portion such as the stator 102 is larger than that of heat generated in the inverter portion 300 and a temperature rise of the motor case portion 13 is large, it is preferable that the tubular case 16 is formed of a member having a thermal conductivity lower than that of the metal, for example, a PPS resin. This is to suppress thermal interference between the inverter portion 300 and the motor case portion 13. When a temperature rise of the motor portion is transferred to the inverter portion 300, the inverter portion 300 is not only affected by self-heating, but is also affected by heat generation of the motor portion, which may cause a large temperature rise. Further, in general, a heat resistant temperature of electric components constituting an inverter is lower than that of members constituting the motor portion. For this reason, it is preferable that the tubular case 16 is formed of a member having a low thermal conductivity to reduce heat conduction from the motor portion.

(Inverter Portion 300)

The inverter portion 300 includes the printed circuit board 305, an input connector 301 attached to the printed circuit board 305 through connection lead lines 306, a filter coil 302, smoothing capacitors 304, and a metal-oxide-semiconductor field-effect transistor (MOSFET) 303 attached to the printed circuit board 305.

One surface (front surface) of the printed circuit board 305 is attached to the other surface of the board-side heat radiation member 15. That is, the printed circuit board 305 has a surface substantially perpendicular to the front and rear direction. The connection lead lines 306 extend in a direction substantially perpendicular to the printed circuit board 305, that is, substantially in the front-rear direction. For this reason, an excitation force due to the reciprocation of the mover in the front and rear direction, which is a movable direction of the mover 11, is substantially parallel to an extending direction of the connection lead lines 306, and vibration resistance of circuit elements or electronic components such as the input connector 301, the filter coil 302, and the smoothing capacitors 304 can be thus improved.

More specifically, the circuit elements or the electronic components connected to the printed circuit board 305 through the connection lead lines 306 have a structure in which it is easy to perform a swing motion such as a pendulum motion as illustrated by blacked arrows in FIG. 2 with respect to the top and bottom direction or the left and right direction, but have a difficulty in performing the swing motion with respect to the force in the front and rear direction, which is the extending direction of the connection lead lines 306.

The input connector 301 is a terminal having a rear end to which an input cable (not illustrated) can be connected. The input cable can be electrically connected to a commercial power supply or a battery (not illustrated) to supply power to the inverter portion 300 through the input connector 301. When the input cable is connected to the input connector 301, a vibration direction of the linear motor 1 and an extending direction of a connection portion of the input cable are substantially parallel to each other, and it is thus possible to suppress stress from being applied to the input cable in a direction in which the input cable is sheared.

[Layout of Linear Compressor 1]

In the linear compressor 1, the spring member 12 and the board-side heat radiation member 15 are interposed between the inverter portion 300 and the stator 102. Both of the inverter portion 300 and the stator 102 are members (components) generating a relatively large amount of heat, but the inverter portion 300 and the stator 102 are separated from each other with the spring member 12 and the board-side heat radiation member 15 interposed therebetween, such that thermal interference can be suppressed.

In addition, in a case where the board-side heat radiation member 15 is a metal member or the like, it is easy to radiate the heat of the inverter portion 300 from the board-side heat radiation member 15 positioned on the other surface side of the tubular case 16. On the other hand, in a case where the motor-side heat radiation member 13 (the plate-shaped portion 131, and more preferably the positioning portion 132) is a metal member or the like, it is easy to radiate the heat of the stator 102 from the motor-side heat radiation member 13 positioned on one surface side of the tubular case 16. As described above, the heat of the inverter portion 300 and the heat of the stator 102 can be radiated from different members, respectively, such that heat radiation performance can be further improved. In addition, a longitudinal direction of the tubular case 16 is a direction along the front and rear direction, and the motor-side heat radiation member 13 and the board-side heat radiation member 15 are disposed at both end portions of the tubular case 16 in the longitudinal direction of the tubular case 16, respectively. For this reason, a heat radiation effect can be further improved.

In addition, the piston 11 and the cylinder 14 also generate a relatively large amount of heat by compression of the gas. In the present embodiment, the piston 11 and the cylinder 14 are positioned on an opposite side to the inverter portion 300 through the spring member 12, the board-side heat radiation member 15 and the tubular case 16, and thermal interference with the inverter portion 300 can be thus suppressed.

Since the heat resistance temperature of the components used for the inverter portion 300 is approximately 125° C. to 150° C., which is lower than that of the other members, it is necessary to avoid a temperature rise of these components. For this reason, in the present embodiment, the inverter portion 300 is disposed in a section different from a section in which the piston 14 or the stator 102 is disposed.

[Appearance of Linear Compressor 1]

Figure 3:
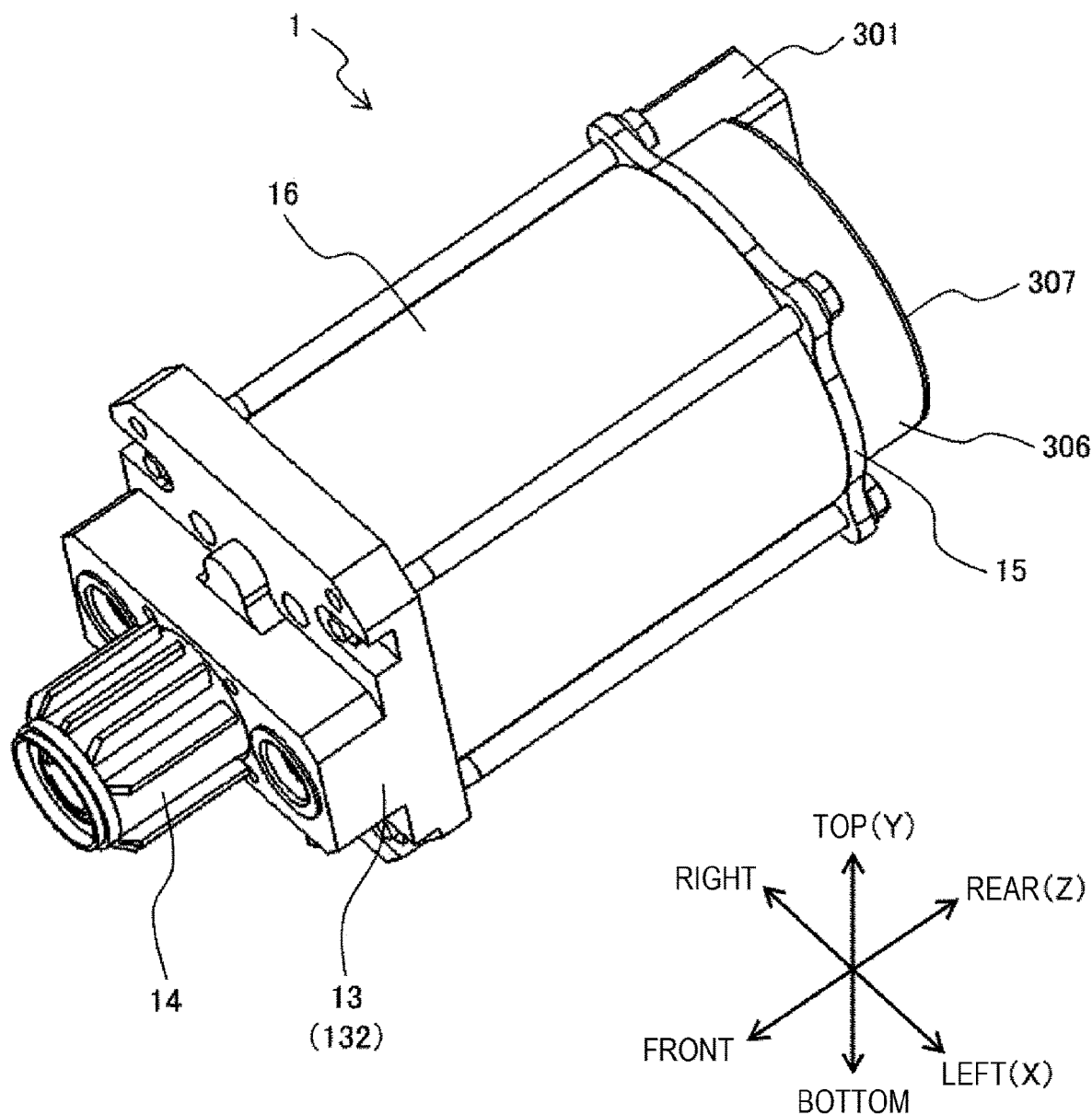
FIG. 3 is a perspective view of the linear compressor according to the first embodiment.

FIG. 3 is a perspective view of the linear compressor 1. The linear motor 10 and the spring member 12 are included in a section substantially formed by the motor-side heat radiation member 13, the board-side heat radiation member 15, and the tubular case 16.

The inverter portion 300 has a side and a rear surrounded, respectively, by a side cover 306 and a top cover 307 and a front surrounded by the board-side heat radiation member 15, and is included in a section substantially formed by the side cover 306, the top cover 307, and the board-side heat radiation member 15.

In joints between members constituting outer walls of the linear motor 1, such as each of the motor-side heat radiation member 13, the board-side heat radiation member 15, the tubular case 16, the input connector 301, the side cover 306, and the top cover 307, it is possible to increase waterproofness by using a seal material such as an O ring, if necessary.

In addition, the input connector 301 of the inverter portion 300 and the side cover 306 may be molded integrally with each other by a mold resin or the like. In this way, it is possible to reduce the number of components.

[Separation of Spaces of Linear Motor 10 and Inverter Portion 300]

A space in which the linear motor 10 is accommodated and a space in which the inverter portion 300 is housed are partitioned and separated from each other by the board-side heat radiation member 15 or the like. For this reason, the board-side heat radiation member 15 is formed of a metal, such that it is possible to shield a leakage magnetic flux generated by the linear motor 10 from jumping into an inverter circuit 300 as electromagnetic noise. That is, an erroneous operation of the inverter portion 300 due to the leakage magnetic flux of the linear motor 10 can be suppressed.

Second Embodiment

Figure 4:
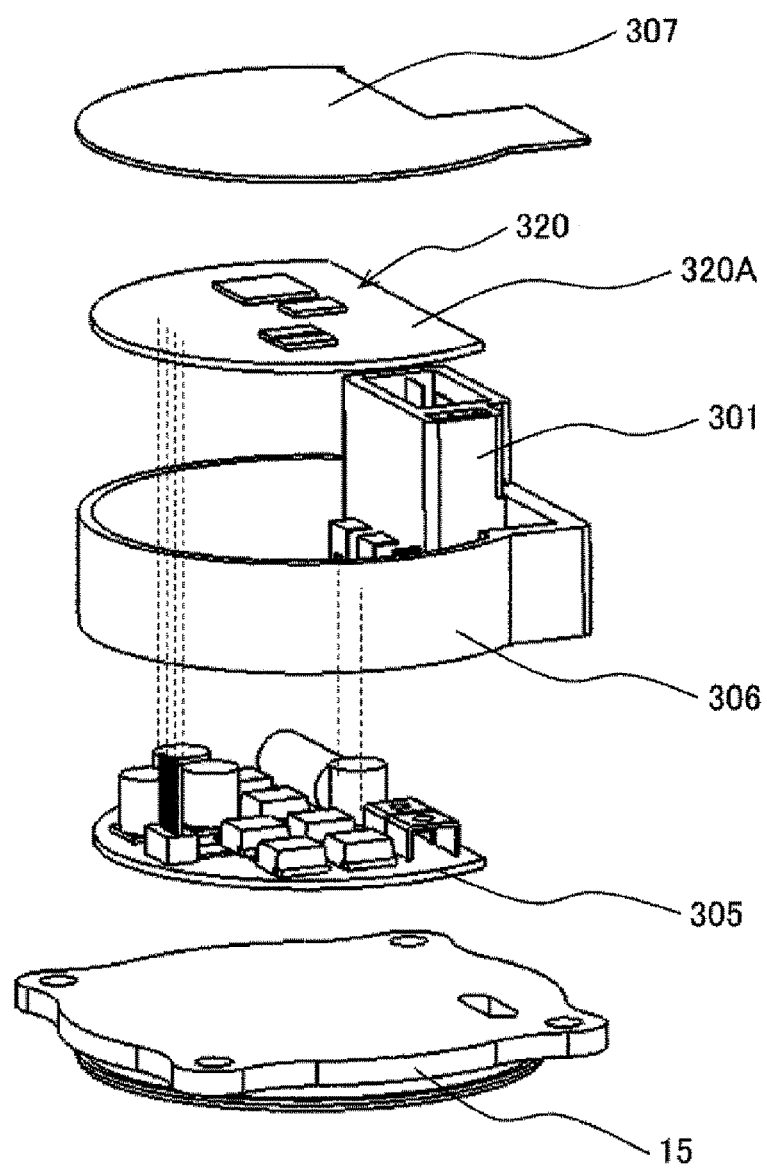
FIG. 4 is an exploded view of an inverter portion and components positioned in the vicinity of the inverter portion according to a second embodiment.
Figure 5:
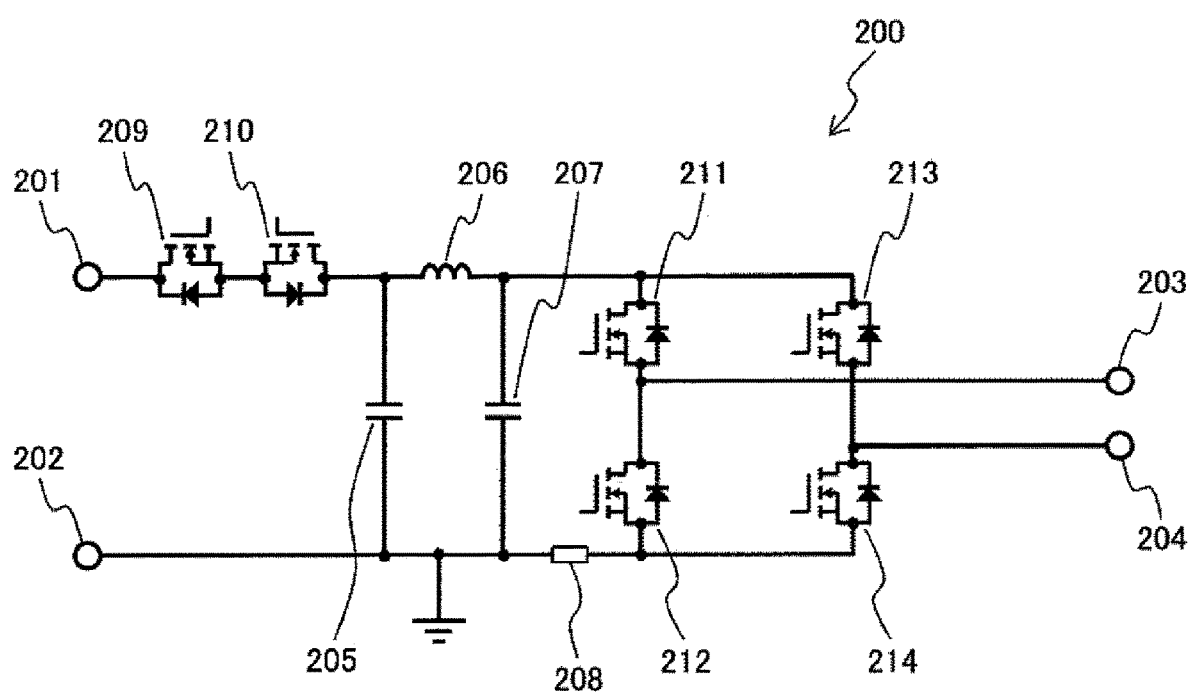
FIG. 5 is a circuit diagram of a main circuit of the inverter portion according to the second embodiment.

A configuration of a second embodiment can be similar to that of the first embodiment except for the following contents. FIG. 4 is an exploded view of an inverter portion 300 and components positioned in the vicinity of the inverter portion 300, and FIG. 5 is a circuit diagram of a main circuit 200 of the inverter portion 300. The inverter portion 300 includes a main circuit 200 provided on a printed circuit board 305 and performing power conversion for converting direct current (DC) power into alternating current (AC) power and a control circuit portion having a control circuit 320 disposed on a control circuit board 320A and controlling the main circuit 200.

In the present embodiment, the printed circuit board 305 and the control circuit board 320A are separately configured, such that a stacked structure is formed. With such a stacked structure, it is possible to configure an inverter circuit in a limited space. Input terminals 201 and 202, output terminals 203 and 204, a filter capacitor 205, a filter coil 206, a smoothing capacitor 207, a shunt resistor 208, power supply relays 209 and 210, and MOSFET 211 to 214 are mounted in the main circuit 200.

ICs such as drivers for driving the MOSFETs 211 to 214 of the main circuit 311, a microcomputer for generating a command pulse, a low voltage regulator, and the like, are mounted on the control circuit board 320.

MOSFETs or electrolytic capacitors and the like mounted on the printed circuit board 305 are heat generation components, and need to be cooled in terms of heat resistance and lifespan. For this reason, for example, a heat radiation sheet is provided between the printed circuit board 305 and the board-side heat radiation member 15 to release heat from the printed circuit board 305 to the board-side heat radiation member 15, such that a temperature rise of the MOSFETs, the electrolytic capacitors or the like can be suppressed. More preferably, it is effective in reducing a temperature to provide thermal vias around heat generation components on the printed circuit board 305 to lower a thermal resistance from an upper surface portion of the printed circuit board 305 to a lower surface portion of the printed circuit board 305.

The main circuit 200 inputs a DC voltage to the input terminals (battery side terminals) 201 and 202, and outputs an AC voltage to the output terminals (motor side terminals) 203 and 204 by a switching operation of the MOSFETs 211 to 214 constituting a full bridge. The smoothing capacitor 207 is provided on an input side of the MOSFET 211 to 214 in order to suppress a DC voltage fluctuation of the battery side terminals 201 and 202 due to the switching operation of the MOSFETs 211 to 214. In addition, the shunt resistor 208 is provided between the smoothing capacitor 207 and the MOSFET 211 to 214 in order to detect an output current. A normal coil 206 constituting a noise filter and the filter capacitor 205 are connected to the input side of the smoothing capacitor 207, and MOSFETs 209 and 210 constituting the power supply relays are provided on input sides of the normal coil 206 and the filter capacitor 205.

Third Embodiment

A configuration of a third embodiment can be similar to that of the first embodiment or the second embodiment except for the following contents.

Figure 6:
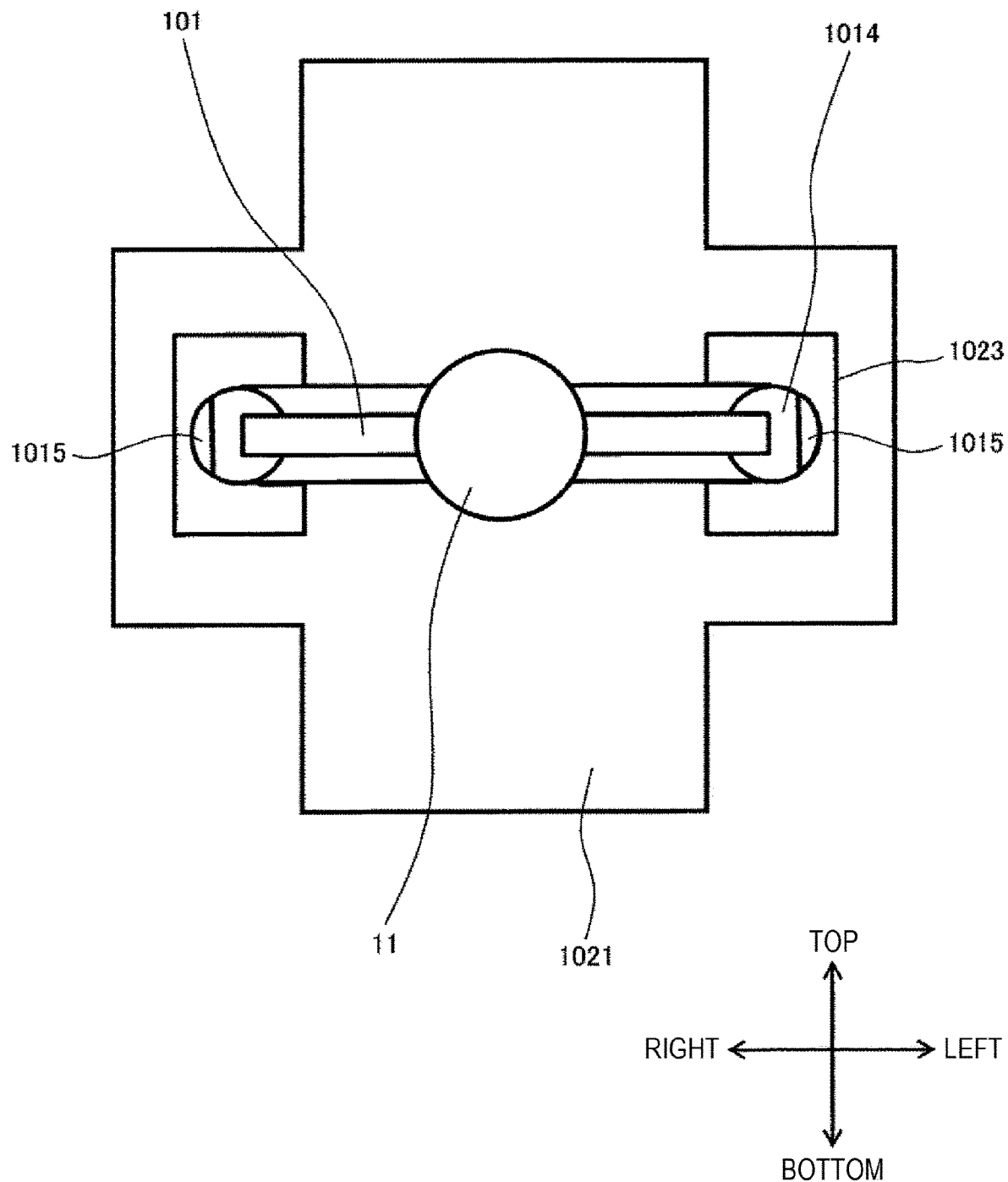
FIG. 6 is a cross-sectional view of a linear compressor according to a third embodiment taken along a direction perpendicular to a front and rear direction, in which a piston is additionally illustrated.

FIG. 6 is a cross-sectional view of a linear compressor 1 according to the present embodiment taken along a direction perpendicular to a front and rear direction, in which a piston 11 is additionally illustrated (windings 1022 and the like are not illustrated). The linear compressor 1 includes guides 1014 attached to a mover 101 and guide support portions 1023 sliding on the guides 1014.

The guides 1014 are fitted to end portions of a plate-shaped mover 101 in a left and right direction, and have a shape in which they can have gaps 1015 between the guides 1014 and the guide support portions 1023 on opposite sides to the mover 101. A region occupied by the guide 1014 and the gap 1015 in the guide support portion 1023 is substantially circular when viewed in the axial direction. The gap 1015 has a shape in which the guide 1014 is cut in a direction substantially perpendicular to the mover 101.

[Device Mounted with Linear Compressor 1]

A device mounted with the linear compressor 1 can be various known devices using a compressor, for example, an air suspension mounted in an automobile, a refrigerator or an air conditioner mounted with a refrigeration cycle, a pump pumping liquid such as well water, an air compressor or a gas compressor compressing a gas such as air, and the like. Hereinafter, examples in which the linear compressor 1 is applied to the air suspension and the refrigerator will be described.

(Air Suspension Device 3004)

FIG. 6 is a view illustrating a vehicle 3001 mounted with an air suspension device 3004, which is an example of the device mounted with the linear compressor 1. In the present embodiment, a case where an air suspension for a vehicle is mounted in a vehicle such as a four-wheeled vehicle will be described by way of example.

A vehicle body 3002 is a body of the vehicle 3001. A total of four wheels 3003 consisting of left and right front wheels and left and right rear wheels are provided under the vehicle body 3002. The air suspension device 3004 includes four air springs 3005 provided, respectively, between the vehicle body 3002 and the respective wheels 3003, an air compressor 3006, a valve unit 3008, and a controller 3011. The air suspension device 3004 adjusts a vehicle height by supplying compressed air from a linear compressor 3006 to the respective air springs 3005 and discharging the compressed air from the respective air springs 3005.

In the present embodiment, the linear compressor 1 according to the embodiment described above is adopted as the air compressor 3006. The air compressor 3006 is connected to the valve unit 3008 through a supply and discharge conduit (pipe) 3007. The valve unit 3008 is provided with four supply and discharge valves 3008*a* each of which is provided for each wheel 3003 and is formed of a solenoid valve. A branch conduit (pipe) 3009 is provided between the valve unit 3008 and the air spring 3005 of each wheel 3003. The air spring 3005 is connected to the air compressor 3006 through the branch conduit 3009, the supply and discharge valve 3008*a*, and the supply and discharge conduit 3007. The valve unit 3008 opens and closes the supply and discharge valve 3008*a* depending on a signal from the controller 3011 to supply and discharge the compressed air to and from each air spring 3005, thereby adjusting the vehicle height.

In the present embodiment, the vibration resistance of the inverter portion 300 can be improved and the heat radiation performance can be improved, and it is thus possible to improve reliability of the air compressor 3006 and the air suspension device 3004 in a severe environment of the vehicle.

(Refrigerator 2001)

Figure 7:
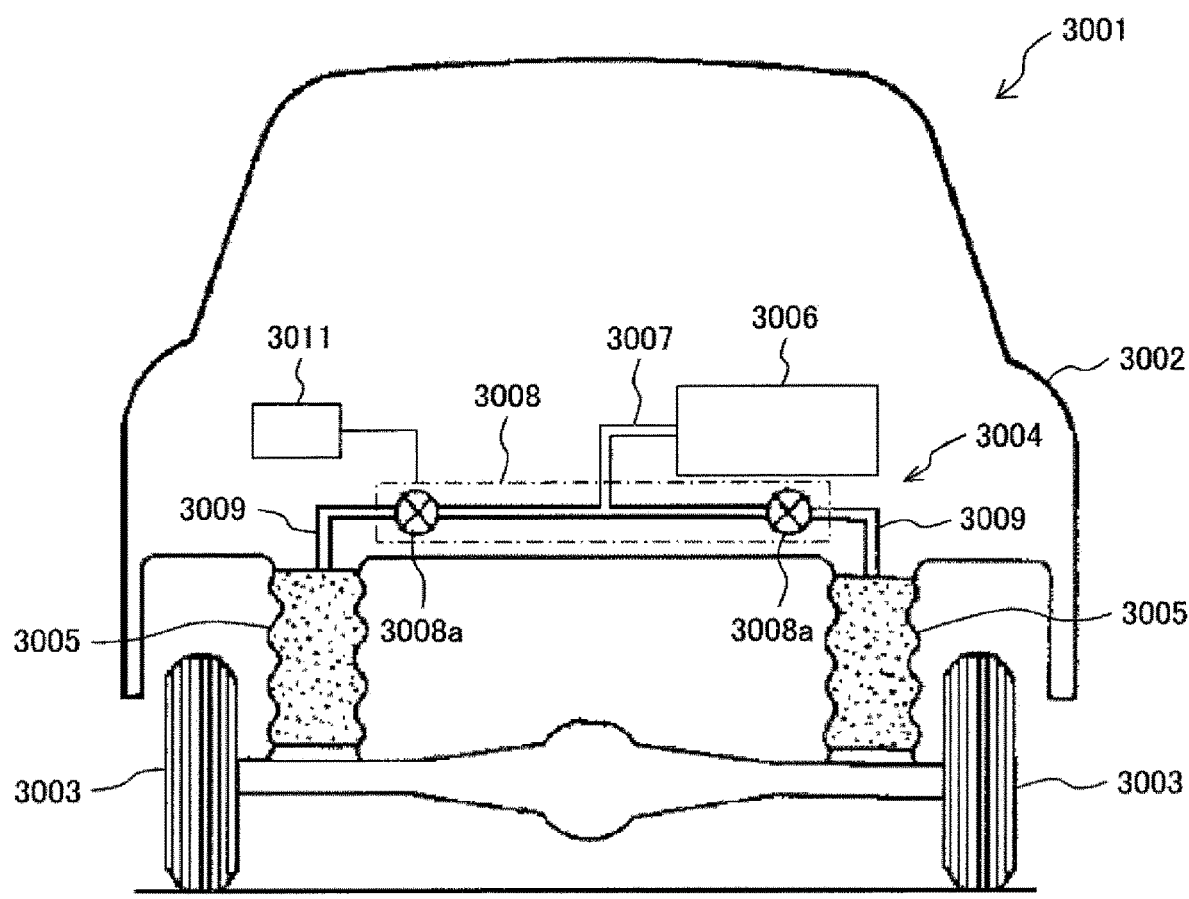
FIG. 7 is a schematic diagram of an air suspension device, which is an example of a device mounted with the linear compressor, and a vehicle.
Figure 8:
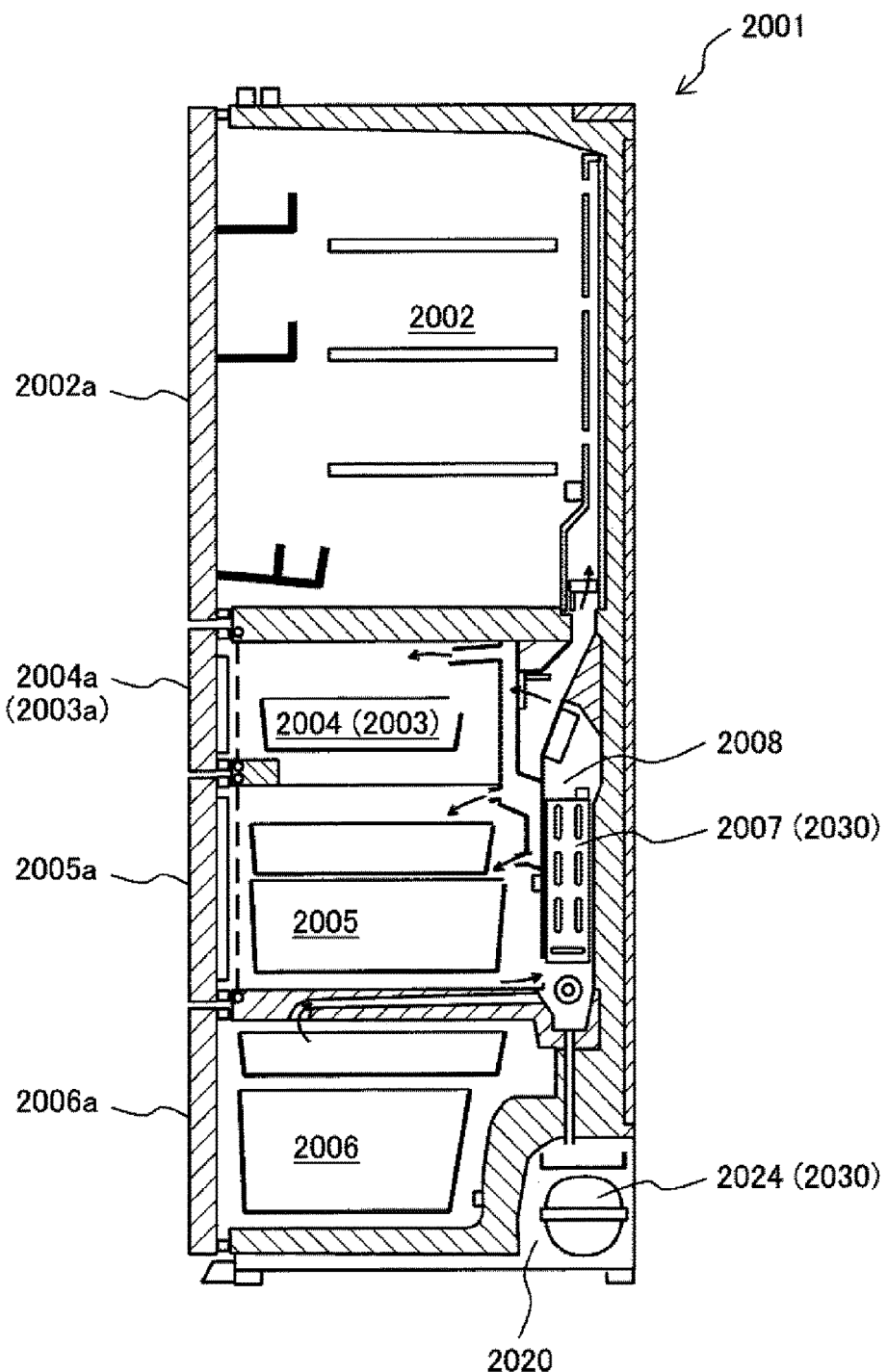
FIG. 8 is a view illustrating a refrigerator, which is an example of a device mounted with the linear compressor.

FIG. 7 is a view illustrating a refrigerator 2001, which is an example of a device mounted with the linear compressor 1. The refrigerator 2001 includes hinged double-door cold storage chamber doors 2002a positioned on a front surface side of a cold storage chamber 2002 and divided into the left and the right, and includes a drawer-type ice making chamber door 2003a, an upper stage freezing chamber door 2004a, a lower stage freezing chamber door 2005a, and a vegetable chamber door 2006a positioned, respectively, on front surface sides of an ice making chamber 2003, an upper stage freezing chamber 2004, a lower stage freezing chamber 2005, and a vegetable chamber 2006.

A machine chamber 2020 is provided on a back surface side of the vegetable chamber 2006, and a compressor 2024 is disposed in the machine chamber 2020. In addition, an evaporator chamber 2008 is provided on back surface sides of the ice making chamber 2003, the upper stage freezing chamber 2004, and the lower stage freezing chamber 2005, and an evaporator 2007 is provided in the evaporator chamber 2008. In the refrigerator 2001, in addition to the compressor 2024 and the evaporator 2007, a radiator, a capillary tube which is a depressurizing means, a three-way valve, and the like that are not illustrated are connected to each other by a refrigerant pipe to form a refrigeration cycle 2030.

In the present embodiment, the linear compressor 1 according to the embodiment described above is adopted as the compressor 2024 constituting the refrigeration cycle 2030 of the refrigerator 2001. As a result, the vibration resistance of the inverter portion 300 can be improved and the heat radiation performance can be improved, and it is thus possible to provide a refrigerator having a high reliability.

[Other Technical Idea]

The present application includes the following technical idea.

A linear compressor including: a tubular case which has a stator disposed therein, the stator being provided with windings; a board-side heat radiation member whose one surface faces one end side of the tubular case; and a piston and a cylinder which are provided on the other end side of the tubular case, wherein an inverter portion is provided on the other surface of the board-side heat radiation member.

The invention is not limited to each of the embodiments described above, but includes various modified examples. For example, the embodiments described above have been described in detail in order to explain the invention in an easy-to-understand manner, and are not necessarily limited to including all the components. In addition, some of the components of any embodiment can be replaced by components of another embodiment, and components of another embodiment can be added to components of any embodiment. In addition, it is possible to add, delete, and replace other components with respect to some of the components of the respective embodiments.

REFERENCE SIGNS LIST

1 linear compressor
10 linear motor
101 mover
1011, 1012 permanent magnet (hard magnetic material)
1013 magnet support portion
1014 guide
102 stator
1021 core (soft magnetic material)
1022 coil (winding)
1023 guide support portion
11 piston
12 spring member (elastic body)
13 motor-side heat radiation member
131 plate-shaped portion
132 positioning portion
14 cylinder
141 suction portion
142 discharge portion
15 board-side heat radiation member
201, 202 input terminal (battery side terminal)
203, 204 output terminal (motor side terminal)
205 filter capacitor
206 filter coil (normal coil)
207 smoothing capacitor
208 current detection resistor (shunt resistance)
209, 210 MOSFET (power supply relay)
211, 212, 213, 214 MOSFET (for full bridge)
300 inverter portion
301 input connector
302 filter coil (normal coil)
303 MOSFET
304 smoothing capacitor
305 printed circuit board
306 side cover
307 top cover
310 main circuit board
311 main circuit
320 control circuit
320A control circuit board
2001 refrigerator
2020 machine chamber
2024 compressor
2030 refrigeration cycle
3001 vehicle
3002 vehicle body
3003 wheel
3004 air suspension
3005 air spring
3006 air compressor
3008 valve unit
3011 controller

The invention claimed is:

1. A linear compressor comprising:
a mover and a stator, in which the mover relatively moves in a first direction and a second direction that is an opposite direction to the first direction with respect to the stator; and
an inverter portion which includes a printed circuit board and circuit elements connected to the printed circuit board through connection lead lines extending from the printed circuit board,
wherein the printed circuit board is installed in a direction substantially perpendicular to the first direction,
wherein the mover includes a first magnet and a second magnet, and
wherein at least one guide is fitted to an end of the mover, and is supported by a guide support portion, the at least one guide being formed such that a gap is present between part of the guide support portion and the guide.

2. The linear compressor according to claim 1, wherein one surface of the printed circuit board is attached to a board-side heat radiation member,
one end of an elastic body is connected to the other end of the mover,
the other end of the elastic body is connected to the board-side heat radiation member, and
the elastic body and the board-side heat radiation member are positioned between the printed circuit board and the mover.

3. The linear compressor according to claim 1, wherein a piston is connected to one end of the mover,
the linear compressor further comprises a cylinder having an inner surface with which the piston is in sliding-contact, and
the printed circuit board is positioned on the other end side of the mover.

4. The linear compressor according to claim 1, wherein the stator having a core around which a winding is wound is provided in a region between one end and the other end of the mover, and the linear compressor further comprises a motor-side heat radiation member which is in contact with the core.

5. The linear compressor according to claim 4, further comprising a tubular case,
wherein the board-side heat radiation member is positioned on the other end side of the tubular case, and
the motor-side heat radiation member is positioned on one end side of the tubular case.

6. The linear compressor according to claim 4, wherein the motor-side heat radiation member includes a plate-shaped portion which is in contact with the core and a positioning portion which is integral with or separate from the plate-shaped portion and is in contact with the cylinder.

7. The linear compressor according to claim 5, wherein the positioning portion, the tubular case, and the board-side heat radiation member substantially form a space including the mover and the stator, and
the inverter portion is positioned outside the space.

8. A device mounted with the linear compressor according to claim 1.

9. The linear compressor according to claim 2, wherein a piston is connected to one end of the mover,
the linear compressor further comprises a cylinder having an inner surface with which the piston is in sliding-contact, and
the printed circuit board is positioned on the other end side of the mover.

10. The linear compressor according to claim 3, wherein the stator having a core around which a winding is wound is provided in a region between one end and the other end of the mover, and the linear compressor further comprises a motor-side heat radiation member which is in contact with the core.

11. The linear compressor according to claim 9, wherein the stator having a core around which a winding is wound is provided in a region between one end and the other end of the mover, and the linear compressor further comprises a motor-side heat radiation member which is in contact with the core.

12. The linear compressor according to claim 11, further comprising a tubular case,
wherein the board-side heat radiation member is positioned on the other end side of the tubular case, and
the motor-side heat radiation member is positioned on one end side of the tubular case.

13. The linear compressor according to claim 10, further comprising a tubular case, wherein the board-side heat radiation member is positioned on the other end side of the tubular case, and the motor-side heat radiation member is positioned on one end side of the tubular case.

14. The linear compressor according to claim 10, wherein the motor-side heat radiation member includes a plate-shaped portion which is in contact with the core and a positioning portion which is integral with or separate from the plate-shaped portion and is in contact with the cylinder.

15. The linear compressor according to claim 11, wherein the motor-side heat radiation member includes a plate-shaped portion which is in contact with the core and a positioning portion which is integral with or separate from the plate-shaped portion and is in contact with the cylinder.

16. The linear compressor according to claim 5, wherein the motor-side heat radiation member includes a plate-shaped portion which is in contact with the core and a positioning portion which is integral with or separate from the plate-shaped portion and is in contact with the cylinder.

17. The linear compressor according to claim 12, wherein the motor-side heat radiation member includes a plate-shaped portion which is in contact with the core and a positioning portion which is integral with or separate from the plate-shaped portion and is in contact with the cylinder.

18. The linear compressor according to claim 13, wherein the motor-side heat radiation member includes a plate-shaped portion which is in contact with the core and a positioning portion which is integral with or separate from the plate-shaped portion and is in contact with the cylinder.

19. The linear compressor according to claim 12, wherein the positioning portion, the tubular case, and the board-side heat radiation member substantially form a space including the mover and the stator, and
the inverter portion is positioned outside the space.

20. The linear compressor according to claim 13, wherein the positioning portion, the tubular case, and the board-side heat radiation member substantially form a space including the mover and the stator, and
the inverter portion is positioned outside the space.

* * * * *